(12) United States Patent
Kim et al.

(10) Patent No.: US 12,056,498 B2
(45) Date of Patent: Aug. 6, 2024

(54) ELECTRONIC DEVICE FOR BOOTING OPERATING SYSTEM USING PLURALITY OF CORES AND OPERATION METHOD THEREOF

(71) Applicant: Samsung Electronics Co., Ltd., Suwon-si (KR)

(72) Inventors: Myongjae Kim, Suwon-si (KR); Jeongwoong Lee, Suwon-si (KR); Youngjae Lim, Suwon-si (KR); Soohyung Lee, Suwon-si (KR); Euiseok Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 46 days.

(21) Appl. No.: 17/994,958

(22) Filed: Nov. 28, 2022

(65) Prior Publication Data

US 2023/0176875 A1 Jun. 8, 2023

Related U.S. Application Data

(63) Continuation of application No. PCT/KR2022/018568, filed on Nov. 23, 2022.

(30) Foreign Application Priority Data

Dec. 2, 2021 (KR) .................. 10-2021-0171273
Dec. 10, 2021 (KR) .................. 10-2021-0176692

(51) Int. Cl.
*G06F 9/00* (2018.01)
*G06F 9/38* (2018.01)
*G06F 9/4401* (2018.01)

(52) U.S. Cl.
CPC ......... *G06F 9/4405* (2013.01); *G06F 9/3838* (2013.01); *G06F 9/3877* (2013.01)

(58) Field of Classification Search
None
See application file for complete search history.

(56) References Cited

U.S. PATENT DOCUMENTS 8,595,736 B2 11/2013 Barsness et al.
9,471,329 B2 10/2016 Baker et al.
(Continued)

FOREIGN PATENT DOCUMENTS

CN 109634672 A 4/2019
JP 2013-239196 A 11/2013
(Continued)

*Primary Examiner* — Nitin C Patel
(74) *Attorney, Agent, or Firm* — Jefferson IP Law, LLP

(57) ABSTRACT

An electronic device is provided. The electronic device includes a processor including a plurality of cores and a memory electrically connected with the processor and storing instructions. The instructions store instructions, when executed, causing the processor to control a dispatcher to determine whether loading of a plurality of modules for booting an operating system of the electronic device is completed, identify at least one module, dependency of which is cleared, based on a module information table stored in the memory, as it is determined that there is a module, loading of which is not completed, among the plurality of modules, identify at least one of state information and priority information of a module loader allocated to each of two or more cores among the plurality of cores based on a core information table stored in the memory, as the at least one module is identified, and select at least one of two or more module loaders respectively allocated to the cores and distribute the at least one module, based on the identified information.

20 Claims, 8 Drawing Sheets

(56) References Cited

U.S. PATENT DOCUMENTS

| | | | |
|---|---|---|---|
| 9,600,397 | B2 | 3/2017 | Sauzede et al. |
| 9,767,283 | B2 | 9/2017 | Szor et al. |
| 10,169,105 | B2 | 1/2019 | Zhao et al. |
| 10,198,271 | B2 | 2/2019 | Lv et al. |
| 10,204,223 | B2 | 2/2019 | Szor et al. |
| 2003/0009654 | A1* | 1/2003 | Nalawadi ............... G06F 15/177 713/1 |
| 2004/0268108 | A1 | 12/2004 | Chen et al. |
| 2006/0010344 | A1* | 1/2006 | Zorek, Sr. ........... G06F 11/2025 714/13 |
| 2008/0162878 | A1 | 7/2008 | Zimmer et al. |
| 2009/0271596 | A1 | 10/2009 | Barsness et al. |
| 2011/0283098 | A1 | 11/2011 | Gillespie et al. |
| 2012/0290763 | A1 | 11/2012 | Li |
| 2015/0269015 | A1 | 9/2015 | Baker et al. |
| 2016/0147545 | A1* | 5/2016 | Jain ....................... G06F 11/008 713/100 |
| 2019/0108039 | A1 | 4/2019 | Lei et al. |
| 2021/0263779 | A1 | 8/2021 | Haghighat et al. |

FOREIGN PATENT DOCUMENTS

| | | |
|---|---|---|
| KR | 10-1472644 B1 | 12/2014 |
| KR | 10-1784758 B1 | 10/2017 |
| KR | 10-2018-0034440 A | 4/2018 |
| KR | 10-2018-0073520 A | 7/2018 |
| KR | 10-1884547 B1 | 8/2018 |
| KR | 10-2021-0044219 A | 4/2021 |

* cited by examiner

ELECTRONIC DEVICE FOR BOOTING OPERATING SYSTEM USING PLURALITY OF CORES AND OPERATION METHOD THEREOF

CROSS-REFERENCE TO RELATED APPLICATION(S)

This application is a continuation application, claiming priority under § 365(c), of an International application No. PCT/KR2022/018568, filed on Nov. 23, 2022, which is based on and claims the benefit of a Korean patent application number 10-2021-0171273, filed on Dec. 2, 2021, in the Korean Intellectual Property Office, and of a Korean patent application number 10-2021-0176692, filed on Dec. 10, 2021, in the Korean Intellectual Property Office, the disclosure of each of which is incorporated by reference herein in its entirety.

TECHNICAL FIELD

The disclosure relates to an electronic device for booting an operating system using a plurality of cores and an operation method thereof.

BACKGROUND ART

When loading a device driver built in the form of a module in a kernel booting step, modules of an Android operating system (OS) may have a structure in which they are sequentially executed in the form of serializing them. When the Android OS should run on a multicore central processing unit (CPU) and should load a plurality of modules, as the process named in it exclusively performs the loading of all modules, module loading may be sequentially executed in only one core.

The reason for executing module loading in a serialized structure may be because dependency exists between loaded modules. For example, when module a has dependency for module b, there may be a structure capable of identifying whether module b which should be preceded is loaded and proceeding with loading of module a in the same core after module b is loaded. Thus, an order of the loading of all the modules may be an order where there is no problem with dependency, which may proceed in only one core.

However, a serialized execution structure in an electronic device loaded with the multicore CPU has a problem in which hardware resources having a multicore are not sufficiently used and may lead to a delay of a booting time or the like to be one of factors causing performance degradation of the electronic device.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide an electronic device for satisfying a dependency relationship between modules without a problem while optimizing benefits of parallelism by optimally using hardware resources of a multicore CPU, in loading a plurality of modules which have dependency therebetween, to optimize the performance of module loading and an operation thereof.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a processor including a plurality of cores and a memory electrically connected with the processor and storing instructions. The instructions store instructions, when executed, causing the processor to control a dispatcher to determine whether loading of a plurality of modules for booting an operating system of the electronic device is completed, identify at least one module, dependency of which is cleared, based on a module information table stored in the memory, as it is determined that there is a module, loading of which is not completed, among the plurality of modules, identify at least one of state information and priority information of a module loader allocated to each of two or more cores among the plurality of cores based on a core information table stored in the memory, as the at least one module is identified, and select at least one of two or more module loaders respectively allocated to the cores and distribute the at least one module, based on the identified information.

In accordance with another aspect of the disclosure, an operation method of an electronic device is provided. The operation method includes controlling the processor causing a dispatcher to determine whether loading of a plurality of modules for booting an operating system of the electronic device is completed, identify at least one module, dependency of which is cleared, based on a module information table stored in a memory of the electronic device, as it is determined that there is a module, loading of which is not completed, among the plurality of modules, identify at least one of state information and priority information of a module loader allocated to each of two or more cores among the plurality of cores based on a core information table stored in the memory, as at least one module is identified, and select at least one of two or more module loaders respectively allocated to the cores and distribute the at least one module.

Advantageous Effects

According to various embodiments of the disclosure, the electronic device and the operation method thereof may be provided to satisfy a dependency relationship between modules without a problem while optimizing benefits of parallelism by optimally using hardware resources of a multicore CPU, in loading a plurality of modules which have dependency therebetween, thus optimizing the performance of module loading.

In addition, various effects ascertained directly or indirectly through the disclosure may be provided.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
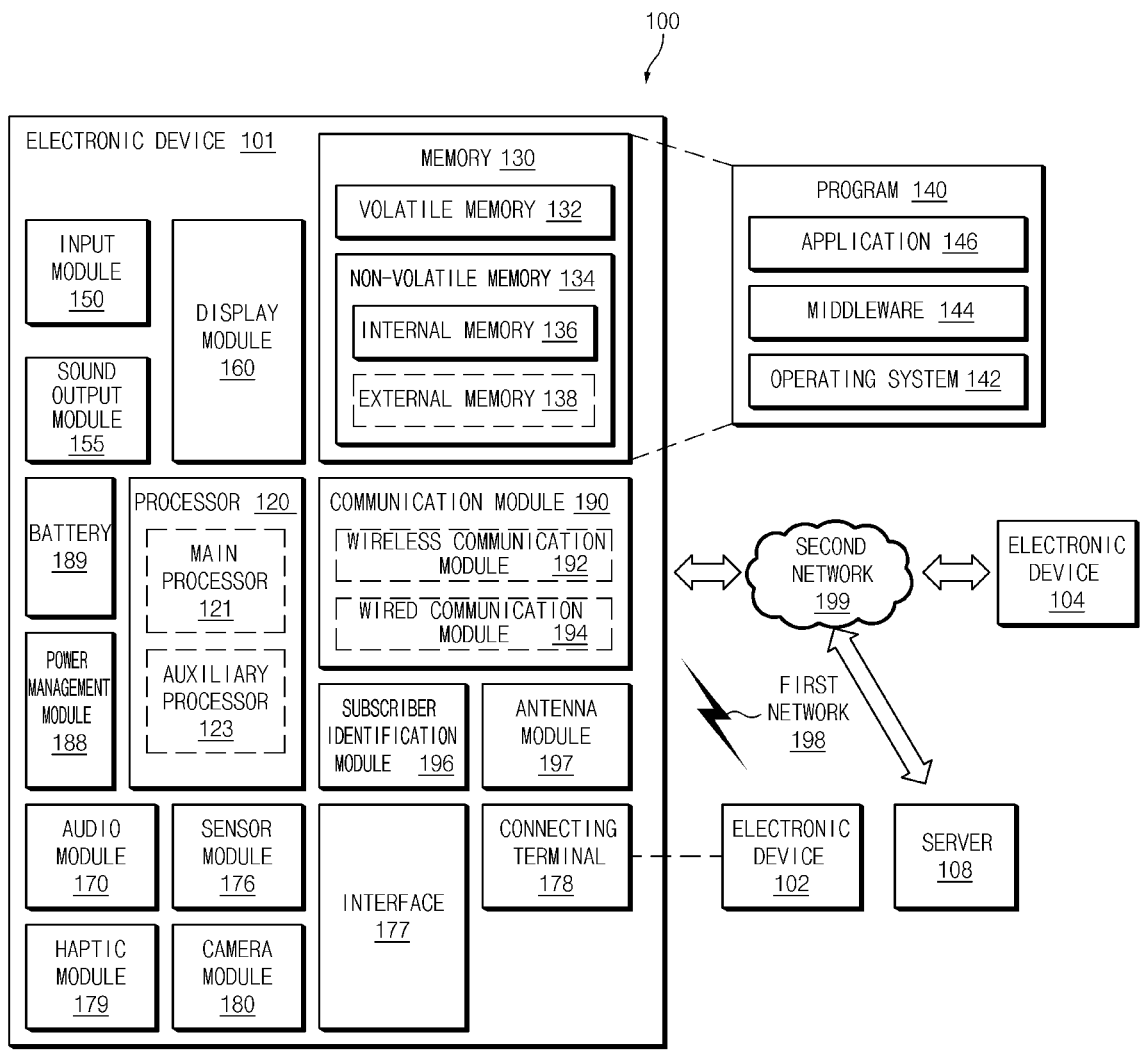
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in another aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, a description will be given of an operation of an electronic device according to an embodiment with reference to FIGS. 2, 3, and 4.

Figure 2:
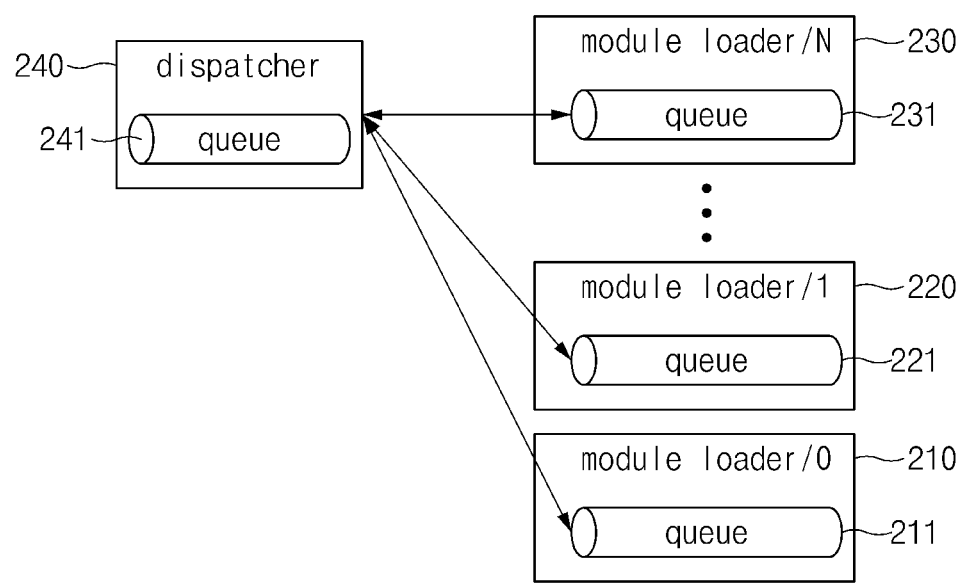
FIG. 2 is a drawing for describing an operation of an electronic device according to an embodiment of the disclosure.

FIG. 2 is a drawing for describing an operation of an electronic device according to an embodiment of the disclosure.

Figure 3:
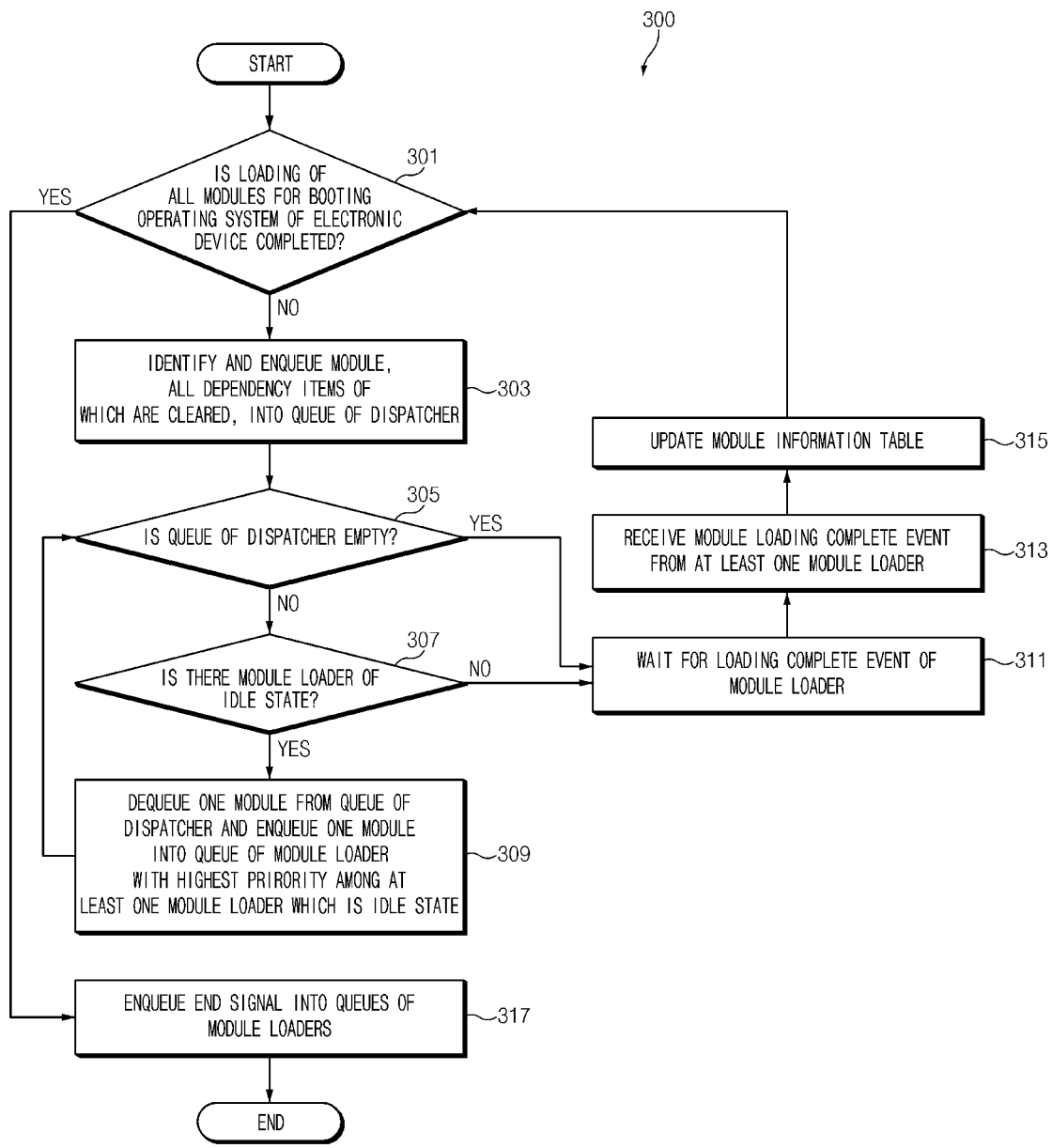
FIG. 3 is a flowchart for describing an operation of an electronic device according to an embodiment of the disclosure.

FIG. 3 is a flowchart for describing an operation of an electronic device according to an embodiment of the disclosure.

Figure 4:
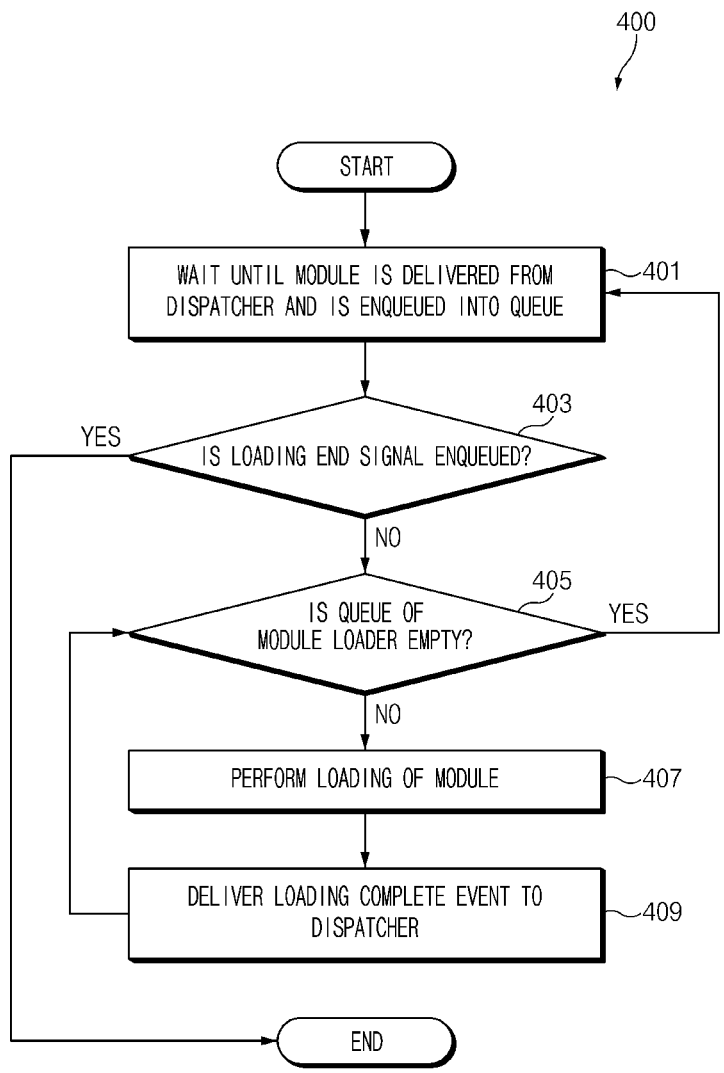
FIG. 4 is a flowchart for describing an operation of an electronic device according to an embodiment of the disclosure.

FIG. 4 is a flowchart for describing an operation of an electronic device according to an embodiment of the disclosure. Hereinafter, an operation of the electronic device may be performed by a processor of the electronic device.

Referring to FIG. 2, a processor (e.g., a processor 120 of FIG. 1) of an electronic device (e.g., an electronic device 101 of FIG. 1) may include a multicore (hereinafter, a plurality of cores) having two or more cores. A memory (e.g., a memory 130 of FIG. 1) of the electronic device may store a plurality of module loaders 210, 220, and 230.

Each of the plurality of cores may correspond to the one module loader 210, 220, or 230. For example, when the processor of the electronic device includes N+1 cores, No. 0 core may correspond to the module loader/0 210, No. 1 core may correspond to the module loader/1 220, . . . , and No. N core may correspond to the module loader/N 230. Alternatively, according to an embodiment, the module loader may correspond to only a core determined as being used for module loading. Each module loader may include a queue 211, 221, or 231 capable of loading a module.

The memory of the electronic device may store a dispatcher 240. The dispatcher 240 may include a queue 241 capable of loading a module ready to be loaded. The dispatcher 240 may perform an operation of distributing a module to the plurality of module loaders 210, 220, and 230 using the queue 241. The dispatcher 240 may correspond to a core independent of the module loaders 210, 220, and 230, but may correspond to a core such as any one module loader. When any one module loader corresponds to a core such as the dispatcher 240, the dispatcher 240 may be in a sleep state while the corresponding module loader loads the module.

Hereinafter, a description will be given of an operation of the dispatcher 240 with further reference to the flowchart of FIG. 3.

Referring to FIGS. 2 and 3, in a method 300, in operation 301, the dispatcher 240 may determine whether the loading of all modules for booting an operating system (e.g., an operating system 142 of FIG. 1) of the electronic device is completed. The operating system stored in the memory of the electronic device may be an Android operating system (OS). The Android OS may load a device driver built in the form of a module in a kernel booting step.

When it is determined that the loading of all the modules is completed in operation 301, in operation 317, the dispatcher 240 may enqueue an end signal into the queues 211, 221, and 231 of the module loaders 210, 220, and 230.

When it is not determined that the loading of all the modules is completed in operation 301, in operation 303, the dispatcher 240 may identify and enqueue a module, all dependency items of which are cleared, into the queue 241 of the dispatcher 240. The dispatcher 240 may determine modules, all dependency of which is cleared as there is no original dependency or the execution of another module is completed, as modules ready to execute loading. The dispatcher 240 may identify and enqueue all of modules ready to execute loading into the queue 241 of the dispatcher 240.

In operation 305, the dispatcher 240 may determine whether the queue 241 of the dispatcher 240 is empty. When the module ready to execute the loading is enqueued into the queue 241 of the dispatcher 240, the queue 241 of the dispatcher 240 may not be empty.

As it is determined that the queue 241 of the dispatcher 240 is not empty in operation 305, in operation 307, the dispatcher 240 may determine whether there is a module loader of an idle state. According to another embodiment, the idle state may refer to a state in which a module loader does not load a module and a queue of the module loader is empty.

As it is determined that there is at least one module loader which is in the idle state in operation 307, in operation 309, the dispatcher 240 may dequeue one module from the queue 241 of the dispatcher 240 and may enqueue the one module into a queue of a module loader with the highest priority among the at least one module loader which is in the idle state. After performing operation 309, the dispatcher 240 may return to operation 305 again.

When the dispatcher 240 determines that the queue 241 of the dispatcher 240 is empty in operation 305 or when the dispatcher 240 does not identify the module loader which is in the idle state in operation 307, in operation 311, it may wait for loading complete events of the module loader 210, 220, and 230. The dispatcher 240 may be in a sleep state while waiting for the loading complete event and may fail to almost affect execution of another module loader.

In operation 313, the dispatcher 240 may receive the module loading complete event from at least one module loader.

In operation 315, the dispatcher 240 may update a module information table stored in the memory. The dispatcher 240 may change a state of the completed module to a loading complete state in the module information table and may change the module, the loading of which is completed, to a state in which dependency for the module, the loading of which is completed, is cleared in a dependency list of modules with dependency, thus updating the module information table. According to yet another embodiment, the memory of the electronic device may store the module information table by means of the processor. The module information table varies in form and may at least include information about a loading state and dependency of a module.

After performing operation 315, the dispatcher 240 may return to operation 301 again. In operation 301, the dispatcher 240 may determine whether the loading of all the modules is completed. When it is determined that the loading of all the modules is completed, in operation 317, the dispatcher 240 may enqueue an end signal into the queues 211, 221, and 231 of the module loaders 210, 220, and 230.

Hereinafter, a description will be given of operations of the module loader 210, 220, and 230 with reference to the method 400 of FIG. 4. The flowchart of FIG. 4 may be the method 400 of an operation of any one of the plurality of module loaders 210, 220, and 230 of FIG. 2.

Referring to FIGS. 2 and 4, in operation 401, the module loaders 210, 220, and 230 may wait until a module is delivered from the dispatcher 240 and is enqueued into the queues 211, 221, and 231. At this time, the module loaders 210, 220, and 230 may be in the idle state.

As the enqueue occurs in the queues 211, 221, and 231 of the module loaders 210, 220, and 230, in operation 403, the module loaders 210, 220, and 230 may determine whether a loading end signal is enqueued. The loading end signal may be a signal delivered to the module loaders 210, 220, and 230 by the dispatcher 240 when the loading of all the modules is completed.

As identifying that the loading end signal is enqueued, the module loaders 210, 220, and 230 may end the process.

As identifying that the loading end signal is not enqueued, in operation 405, the module loaders 210, 220, and 230 may determine whether the queues 211, 221, and 231 of the module loaders 210, 220, and 230 are empty. As it is determined that the queues 211, 221, and 231 are empty, the module loaders 210, 220, and 230 may return to operation 401 to wait until a module is delivered.

As identifying that the queues 211, 221, and 231 are not empty and the module is loaded, in operation 407, the module loaders 210, 220, and 230 may perform the loading of the module.

After the loading of the module is completed, in operation 409, the module loaders 210, 220, and 230 may deliver a loading complete event to the dispatcher 240. Delivering the loading complete event, the module loaders 210, 220, and 230 may return to operation 405 again to determine whether the queues 211, 221, and 231 are empty.

As identifying that the queue is empty in operation 405, waiting until the enqueue occurs in operation 401, and identifying that the loading end signal is enqueued in operation 403, the module loaders 210, 220, and 230 may end the booting process.

Hereinafter, an operation of the electronic device according to an embodiment will be described in detail as an example with reference to FIG. 5.

Figure 5:
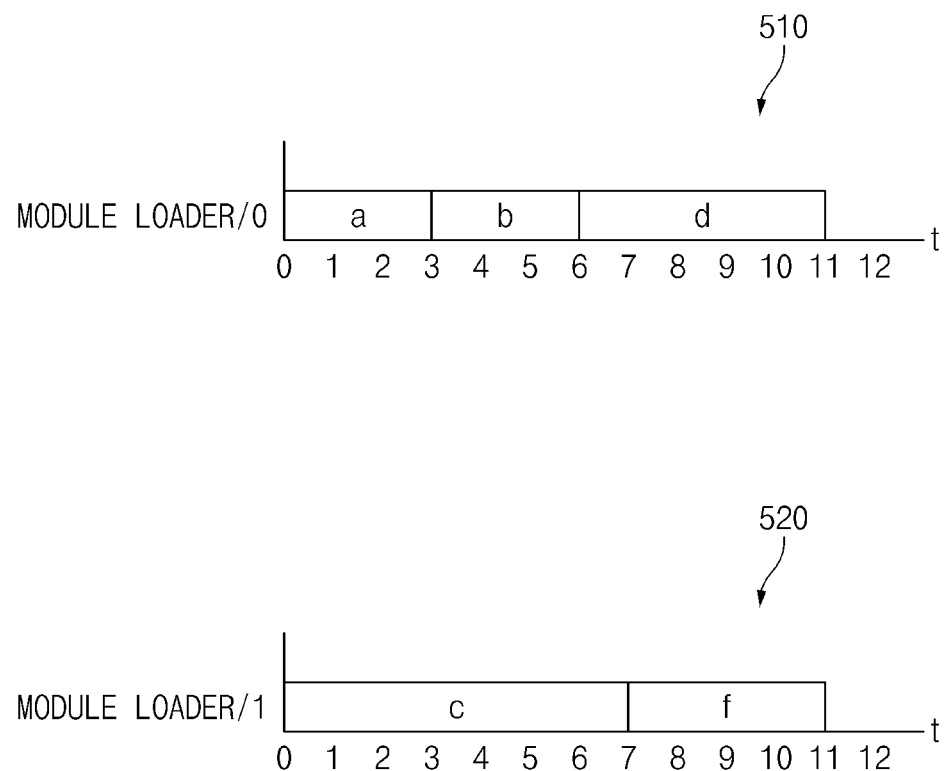
FIG. 5 is a drawing for describing an operation of an electronic device according to an embodiment of the disclosure.

FIG. 5 is a drawing for describing an operation of an electronic device according to an embodiment of the disclosure. FIG. 5 may be a drawing illustrating an operation of a module loader over a timeline in a booting process of an electronic device. Horizontal axes of a first table 510 and a second table 520 of FIG. 5 may refer to time flow.

Referring to FIG. 5, in an embodiment to be described, in an electronic device (e.g., an electronic device 101 of FIG. 1) including a processor (e.g., a processor 120 of FIG. 1) having a plurality of two or more cores, it is assumed that a module loader is allocated to each of two cores. For example, the processor of the electronic device may include No. 0 to 7, 8 cores, a module loader/0 may be allocated to No. 0 core, and a module loader/1 may be allocated to No. 4 core. At this time, the core information table may be as shown in Table 1 below.

TABLE 1

|  | Core Number | |
|---|---|---|
|  | 0 | 4 |
| State | IDLE | IDLE |
| Priority | 2 | 2 |

It is assumed that the module loader/0 allocated to No. 0 core and the module loader/1 allocated to No. 4 core are the same in priority as each other. The module loader/0 and the module loader/1 before a booting process is started may be in an idle state.

A memory of the electronic device may store a module information table as shown in Table 2 below.

TABLE 2

| Module name | State | Workload | Dependency list |
|---|---|---|---|
| a | N | 3 |  |
| b | N | 3 | a |
| c | N | 7 |  |

TABLE 2-continued

| Module name | State | Workload | Dependency list | |
|---|---|---|---|---|
| d | N | 5 | a | |
| f | N | 4 | a | c |

According to another embodiment, the module information table may at least include state information and dependency information of all modules which need loading in a booting step. According to yet another embodiment, the module information table may further include at least one of a module name and a workload.

According to yet another embodiment, a state of a module may be indicated as any one of T, N, or L in the module information table. When the module state is terminated (T), it may refer to a state in which the loading of the module is completed. When the module state is not loaded (N), it may refer to a state in which the loading of the module is not started. When the module state is loading (L), it may refer to a state in which it is loaded in a queue of a dispatcher or a module loader is executing loading.

According to yet another embodiment, an initial state of each module of the module information table is N. The processor may maintain the state of the module as L in the module information table until loading is completed after the module is loaded into the queue of the dispatcher and may change the state of the module, the loading of which is completed, to T. When all modules are in the T state, the booting process may be ended.

According to yet another embodiment, the workload in the module information table may be information which indicates the amount of tasks necessary to load the module as a relative concept number.

According to yet another embodiment, the dependency list in the module information table may be information indicating a name of a module on which a corresponding module depends. There may be no dependency depending on a module, and at least one module may have dependency for at least one other module. That the module has the dependency for the other module may mean that it is possible to load the corresponding module only when the other module is preceded and the loading is completed. For example, module b of Table 2 may have dependency for module a, and it is possible to load module b only after module a is first loaded.

According to yet another embodiment, when the booting process is started, the dispatcher may identify a module, all dependency of which is cleared while the state is N in the module information table. As module a and module c are identified, the dispatcher may load it into a queue of the dispatcher. After module a and module c are loaded into the queue of the dispatcher, the dispatcher may change states of module a and module c to L in the module information table.

The dispatcher may distribute module a and module c loaded into the queue of the dispatcher to the module loader/0 and the module loader/1, which are in the idle state. Because the module loader/0 and the module loader/1 are the same in priority as each other, the dispatcher may distribute modules one by one randomly or in order. For example, the dispatcher may distribute module a to the module loader/0 and may distribute module c to the module loader/1. Completing the distribution of all the modules loaded into the queue of the dispatcher, the dispatcher may wait for a module loading complete event.

Referring to FIG. 5, the module loader/0 and the module loader/1, which receive the modules when t=0, may start loading.

When the loading of module a is completed at a time when t=3, which elapses by the workload of module a, the module loader/0 may deliver the module loading complete event to the dispatcher and may change to the idle state.

The dispatcher may update a state of module a to T in the module information table and may display that dependency for module a is cleared in a dependency list. After the dependency for module a is cleared, the module information table may be as shown in Table 3.

TABLE 3

| Module name | State | Workload | Dependency list | |
|---|---|---|---|---|
| a | T | 3 | | |
| b | N | 3 | a | |
| | | | v | |
| c | L | 7 | | |
| d | N | 5 | a | |
| | | | v | |
| f | N | 4 | a | c |
| | | | v | |

According to yet another embodiment, the indication "v" in Table 3 may be a flag indication indicating that dependency is cleared.

The dispatcher may determine whether the loading of all modules is completed. As identifying that a module, the loading of which is not completed, remains, the dispatcher may search for a module, the state of which is not loaded (N) and all dependency of which is cleared. The dispatcher may identify and enqueue module b and module d into a queue of the dispatcher. After enqueuing module b and module d into the queue of the dispatcher, the dispatcher may change states of module b and module d to L.

The dispatcher may search for a module loader of the idle state. As identifying that the module loader/0 is in the idle state, the dispatcher may dequeue module b from the queue of the dispatcher and may deliver the module b to the module loader/0.

Because both the module loader/0 and the module loader/1 are operating, the dispatcher may stop delivering the module and may wait for the module loading complete event from the module loader. There may be a state in which module d is loaded into the queue of the dispatcher.

The module loader/0 may receive module b at a time when t=3, may load module b into a queue of the module loader/0, and may start to load module b.

When the loading of module b is completed at a time when t=6, which elapses by the workload of module b from a time when t=3, the module loader/0 may deliver the module loading complete event to the dispatcher and may change to the idle state.

The dispatcher may update a state of module b to T in the module information table and may display that dependency for module b is cleared in the dependency list. At this time, the module information table may be as shown in Table 4.

TABLE 4

| Module name | State | Workload | Dependency list | |
|---|---|---|---|---|
| a | T | 3 | | |
| b | T | 3 | a | |
| | | | v | |
| c | L | 7 | | |

TABLE 4-continued

| Module name | State | Workload | Dependency list | |
|---|---|---|---|---|
| d | L | 5 | a | |
|   |   |   | v | |
| f | N | 4 | a | c |
|   |   |   | v | |

The dispatcher may determine whether the loading of all modules is completed. As identifying that a module, the loading of which is not completed, remains, the dispatcher may search for a module, the state of which is not loaded (N) and all dependency of which is cleared. As there is no search result, the loading of the module may fail to be accomplished.

However, because module d is loaded into the dispatcher, the dispatcher may search for a module loader of the idle state. As identifying that the module loader/0 is in the idle state, the dispatcher may dequeue module d from the queue of the dispatcher and may deliver the module d to the module loader/O. Because the queue of the dispatcher is empty, the dispatcher may wait for the module loading complete event from the module.

The module loader/0 may receive module b at a time when t=6, may load module d into a queue of the module loader/0, and may start to load module d.

When the loading of module c is completed at a time when t=7, which elapses by the workload of module c, the module loader/1 may deliver the module loading complete event to the dispatcher and may change to the idle state.

The dispatcher may update a state of module c to T in the module information table and may display that dependency for module c is cleared in the dependency list. At this time, the module information table may be as shown in Table 5.

TABLE 5

| Module name | State | Workload | Dependency list | |
|---|---|---|---|---|
| a | T | 3 | | |
| b | T | 3 | a | |
|   |   |   | v | |
| c | T | 7 | | |
| d | L | 5 | a | |
|   |   |   | v | |
| f | N | 4 | a | c |
|   |   |   | v | v |

The dispatcher may determine whether the loading of all the modules is completed. As identifying that a module, the loading of which is not completed, remains, the dispatcher may search for a module, the state of which is not loaded (N) and all dependency of which is cleared. The dispatcher may identify and enqueue module f into a queue of the dispatcher. After enqueuing module f into the queue of the dispatcher, the dispatcher may change a state of module f to L.

The dispatcher may search for a module loader of the idle state. As identifying that the module loader/1 is in the idle state, the dispatcher may dequeue module f from the queue of the dispatcher and may deliver the module f to the module loader/1.

Because the queue of the dispatcher is empty, the dispatcher may wait for the module loading complete event from the module loader.

The module loader/1 may receive module f at a time when t=7, may load module f into a queue of the module loader/1, and may start to load module f.

When the loading of module c and module d is completed at a time when t=11, which is a time which elapses by the workload of module c from a time when t=7 and a time which elapses by the workload of module d from a time when t=6, the module loader/0 and the module loader/1 may deliver the module loading complete event to the dispatcher and may change to the idle state.

The dispatcher may update states of module c and module d to T in the module information table and may display that dependency for module c and module d is cleared in the dependency list.

As identifying that it is in a state (state T) where the loading of all the modules is completed, the dispatcher may deliver the loading complete event to all the module loaders and may end the operation of the dispatcher. As the module loader/0 and the module loader/1 receive the loading complete event, they may end their operations. The booting process may be ended.

Referring to FIG. 5, the description is given assuming that priorities of all cores selected such that the module loaders are allocated are the same as each other. However, according to an embodiment, a plurality of cores included in an electronic device may differ in calculation capability from each other. In this case, a module distribution priority is assigned to a core with more excellent calculation capability, loading efficiency may be optimized.

When the plurality of cores included in the electronic device differ in calculation capability from each other, they may use a core information table. According to another embodiment, a description will be given assuming that the electronic device has the core information table such as Table 6 below. For example, Table 6 may be the case where the processor of the electronic device includes No. 0 to 7, 8 cores, where the module loader/0 is allocated to No. 0 core, where the module loader/1 is allocated to No. 1 core, where the module loader/2 is allocated to No. 4 core, and where the module loader/3 is allocated to No. 5 core.

TABLE 6

| Loader # | Core # | Priority | State | # of pending module |
|---|---|---|---|---|
| 0 | 0 | 4 | IDLE | 0 |
| 1 | 1 | 2 | BUSY | 0 |
| 2 | 4 | 2 | IDLE | 0 |
| 3 | 5 | 0 | BUSY | 0 |

In Table 6, 'Loader #' may indicate a module loader number, and 'Core #' may indicate a core number of a core to place the corresponding module loader. Furthermore, in Table 6, 'Priority' may indicate a priority of the module loader. As the value of 'Priority' is a lower value, 'Priority' may indicate a higher priority with excellent performance of the core. According to yet another embodiment, as the value of 'Priority' is a higher value, 'Priority' may indicate a priority. Furthermore, in Table 6, 'State' may indicate whether the corresponding module loader is currently performing loading, and '# of pending module' may indicate the number of modules which are loaded into a queue of the module loader while still not performing loading except for a module which is currently performing loading in the corresponding module loader.

The dispatcher may distribute a module to the module loader to meet both the following two conditions. The two conditions may be 1) dividing a module such that the module loader of the idle state is not maximally present and 2) distributing a module from a module loader with a high priority. At this time, condition 1) should be met earlier than condition 2). For example, when all module loaders are two, when one of them is performing loading, and the module loader which is performing the loading has a higher priority than the other module loader, a module newly delivered by the dispatcher may be delivered to another module loader of the idle state rather than the module loader which is performing the loading. When both the two module loaders are performing loading, a module newly delivered by the dispatcher may be delivered in an order of module loaders with a higher priority between the two module loaders.

When the core information table is the same as Table 6 above and when the dispatcher identifies and loads one distributable module into a queue of the dispatcher, module loaders selectable by the dispatcher may be the module loader/0 and the module loader/2, which are in the idle state. At this time, because the module loader/2 is higher in priority than the module loader/0, the dispatcher may distribute the module loaded into the queue of the dispatcher to the module loader/0.

Hereinafter, a description will be given of an operation of an electronic device according to an embodiment with reference to FIGS. 2, 6, and 7.

Figure 6:
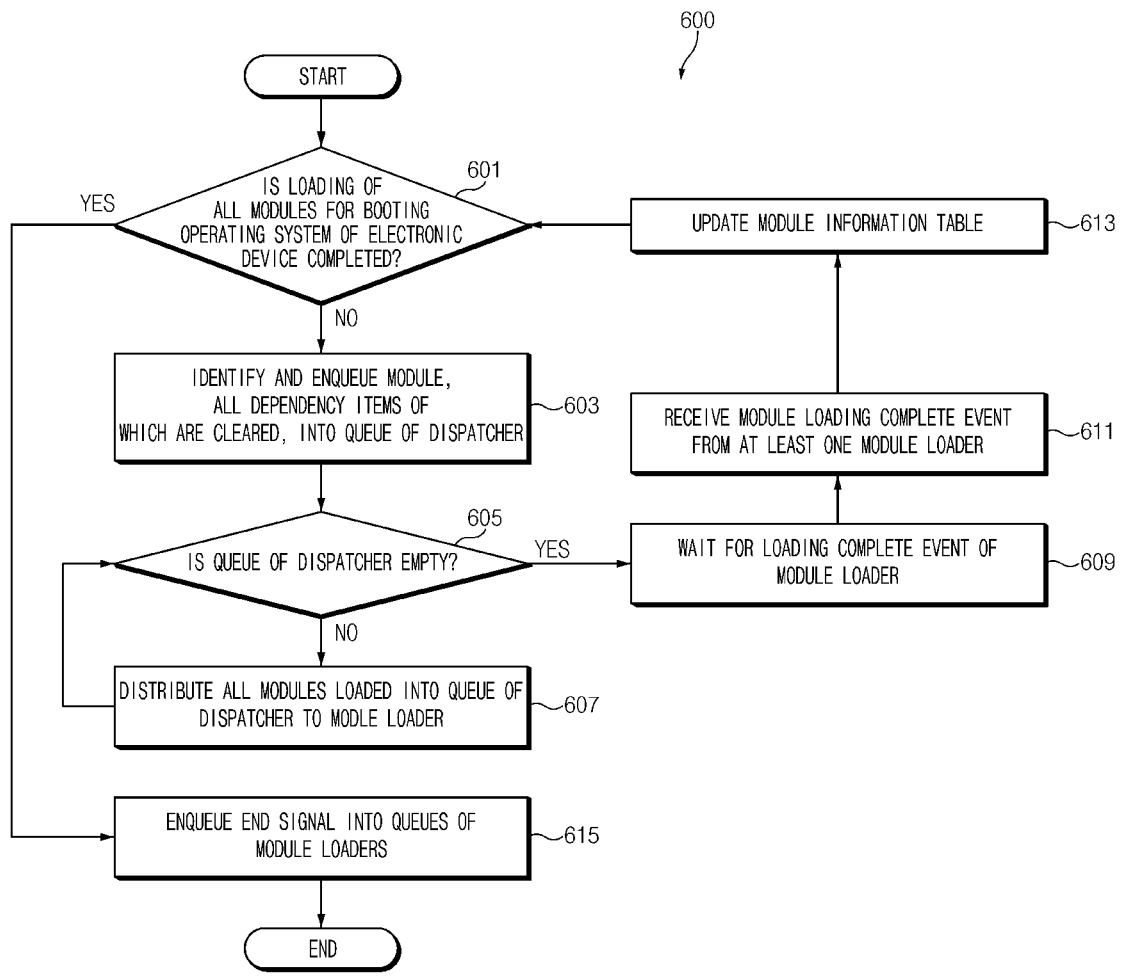
FIG. 6 is a flowchart for describing an operation of an electronic device according to an embodiment of the disclosure.

FIG. 6 is a flowchart for describing an operation of an electronic device according to an embodiment of the disclosure.

Figure 7:
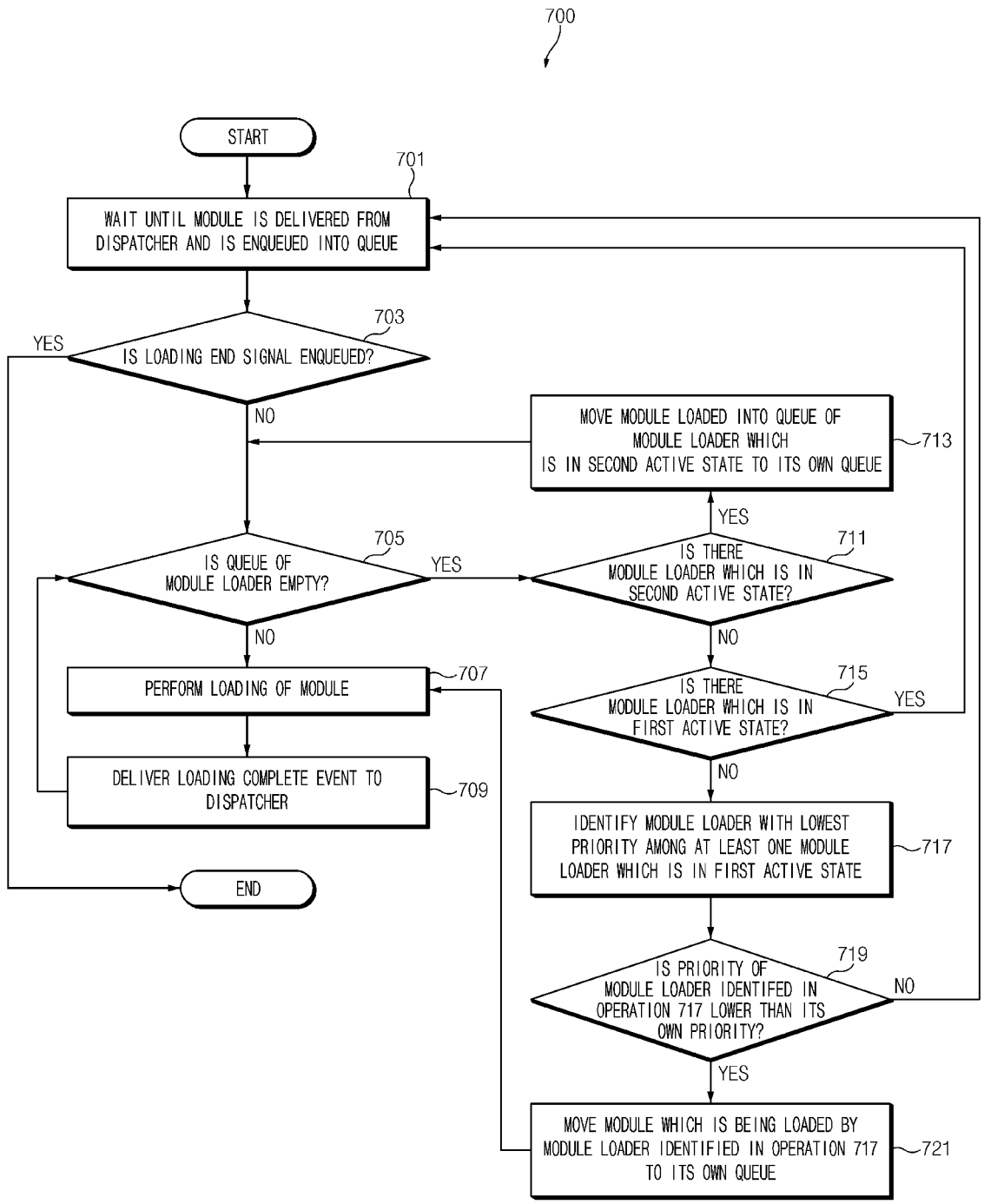
FIG. 7 is a flowchart for describing an operation of an electronic device according to an embodiment of the disclosure.

FIG. 7 is a flowchart for describing an operation of an electronic device according to an embodiment of the disclosure.

Hereinafter, an operation of the electronic device may be performed by a processor of the electronic device.

Referring to FIGS. 2 and 6, in a method 600, in operation 601, a dispatcher 240 may determine whether the loading of all modules for booting an operating system (e.g., an operating system 142 of FIG. 1) of the electronic device is completed. The operating system stored in a memory of the electronic device may be an Android OS. The Android OS may load a device driver built in the form of a module in a kernel booting step.

When it is determined that the loading of all the modules is completed in operation 601, in operation 615, the dispatcher 240 may enqueue an end signal into queues 211, 221, and 231 of module loaders 210, 220, and 230.

When it is not determined that the loading of all the modules is completed in operation 601, in operation 603, the dispatcher 240 may identify and enqueue a module, all dependency items of which are cleared, into a queue 241 of the dispatcher 240. The dispatcher 240 may determine modules, all dependency of which is cleared as there is no original dependency or the execution of another module is completed, as modules ready to execute loading. The dispatcher 240 may identify and enqueue all modules ready to execute loading into the queue 241 of the dispatcher 240.

In operation 605, the dispatcher 240 may determine whether the queue 241 of the dispatcher 240 is empty. When the module ready to execute the loading is enqueued into the queue 241 of the dispatcher 240, the queue 241 of the dispatcher 240 may not be empty.

As determining that the queue 241 of the dispatcher 240 is not empty in operation 605, in operation 607, the dispatcher 240 may distribute all modules loaded into the queue 241 of the dispatcher to a module loader.

When distributing all the modules loaded into the queue 241 of the dispatcher 240 to the module loader, the dispatcher 240 may distribute all the modules under the following conditions.

When there is at least one module loader which is in the idle state, the dispatcher 240 may distribute the modules one by one in an order where a priority of the at least one module loader which is in the idle state is high. Herein, the priorities of the module loaders may be described to be same as priorities of the embodiment described with reference to Table 6 above. When the priority of the at least one module loader which is in the idle state is the same, the dispatcher 240 may distribute the modules one by one in a random order. When a module loader which is in the idle state does not already remain in a state where the distribution of the modules is not completed or when there is no module loader which is in idle state from the distribution of the modules, the dispatcher 240 may distribute the modules in a round-robin scheme in an order of a module loader with the highest priority among all the module loaders.

Even when there is no module loader which is in the idle state, the dispatcher 240 may complete the distribution of all the modules loaded into the queue 241 of the dispatcher 240.

After performing operation 607, the dispatcher 240 may return to operation 605 again.

When determining that the queue 241 of the dispatcher 240 is empty in operation 605, in operation 609, the dispatcher 240 may wait for loading complete events of the module loader 210, 220, and 230. The dispatcher 240 may be in a sleep state while waiting for the loading complete event and may fail to almost affect the execution of another module loader.

In operation 611, the dispatcher 240 may receive a module loading complete event from at least one module loader.

In operation 613, the dispatcher 240 may update a module information table stored in the memory. The dispatcher 240 may change a state of the completed module to a loading complete state in the module information table and may change the module, the loading of which is completed, to a state in which dependency for the module, the loading of which is completed, is cleared in a dependency list of modules with dependency, thus updating the module information table. According to an embodiment, the memory of the electronic device may store the module information table. The modulation information table varies in form and may at least include information about a loading state and dependency of a module.

After performing operation 613, the dispatcher 240 may return to operation 601 again. In operation 601, the dispatcher 240 may determine whether the loading of all the modules is completed. When it is determined that the loading of all the modules is completed, in operation 615, the dispatcher 240 may enqueue an end signal into the queues 211, 221, and 231 of the module loaders 210, 220, and 230.

Hereinafter, a description will be given of operations of the module loader 210, 220, and 230 with reference to the method 700 of FIG. 7. The flowchart of FIG. 7 may be the method 700 illustrating an operation of any one of the plurality of module loaders 210, 220, and 230 of FIG. 2. Hereinafter, for convenience of description, a description will be given assuming that the method 700 of FIG. 7 is an operation of a first module loader (e.g., a module loader/0 210 of FIG. 2).

Referring to FIGS. 2 and 7, in operation 701, the first module loader may wait until a module is delivered from a dispatcher 240 and is enqueued into a queue. At this time, the first module loader may be in an idle state.

As the enqueue occurs in the queue of the module loader, in operation 703, the first module loader may determine whether a loading end signal is enqueued. The loading end signal may be a signal delivered to all module loaders by the dispatcher 240 when the loading of all modules is completed.

As identifying that the loading end signal is enqueued in operation 703, the first module loader may end the process.

As identifying that the loading end signal is not enqueued in operation 703, in operation 705, the first module loader may determine whether a queue of the first module loader is empty.

As identifying that the queue is not empty and is loaded with the module, in operation 707, the first module loader may perform the loading of the module.

After the loading of the module is completed, in operation 709, the first module loader may deliver a loading complete event to the dispatcher 240. Delivering the loading complete event, the first module loader may return to operation 705 again to determine whether the queue is empty.

As identifying that the queue is empty in operation 705, in operation 711, the first module loader may determine whether there is another module loader (e.g., a module loader/1 220 and/or a module loader/N 230 of FIG. 2) which is a second active state. According to an embodiment, the state of the module loader may be divided as shown in Table 7 below. According to another embodiment, the first module loader may identify a second module loader, in which there is a module which is loaded into the queue of the module loader and is waiting for loading and there is a module which is executing loading, as a module loader which is in the second active state. According to yet another embodiment, performing operation 711, the first module loader may be in a first idle state where the module is not loaded in the queue of the module loader and where there is no module which is performing loading.

operation 715, the first module loader may determine whether there is a module loader which is in a first active state. According to yet another embodiment, the first module loader may identify a module loader, in which there is no module loaded into the queue of the module loader and there is only a module which is executing loading, as a module loader which is in the first active state.

As determining that there is no module loader which is in the first active state in operation 715, the first module loader may return to operation 701 to wait until the module is delivered from the dispatcher and is enqueued into the queue.

As identifying at least one of the module loaders which are in the first active state in operation 715, in operation 717, the first module loader may identify a third module loader with the lowest priority among at least one module loader which is in the first active state.

In operation 719, the first module loader may determine whether a priority of the third module loader is lower than its own priority.

As determining that the priority of the third module loader is greater than or equal to its priority in operation 719, the first module loader may return to operation 701 to wait until the module is delivered from the dispatcher and is enqueued into the queue.

As determining that the priority of the third module loader is less than its priority in operation 719, in operation 721, the first module loader may pull a module which is being loaded by the third module loader and may perform the loading of the module.

The embodiment described above with reference to FIGS. 6 and 7 has a difference with the embodiment described with reference to FIGS. 3 and 4 in that the module loader directly

TABLE 7

| State | Module being loaded | Module being in loaded state | Notes |
|---|---|---|---|
| First idle state | X | X | Idle state |
| Second idle state | X | O | State in which module is loaded into queue of module loader, but loading of module is not yet executed. State before first active state or second active state |
| First active state | O | X | State in which there is only module which is executing loading without module loaded into queue of module loader |
| Second active state | O | O | State in which there is module which is loaded into queue of module loader and is waiting for loading and there is module which is executing loading |

As identifying that there is the second module loader which is in the second active state, in operation 713, the first module load may pull a module loaded into a queue of the second module loader to its own queue. According to embodiments, the first module loader may pull all modules loaded into the queue of the second module loader to its own queue and may pull only one module to its own queue.

According to yet another embodiment, when there are two or more module loaders which are in the second active state, the first module loader may pull a module of a module loader with the lowest priority among the plurality of module loaders which are in the second active state.

As determining that there is no another module loader which is in the second active state in operation 711, in pulls (redistributes) a module of another module loader by means of the determination of the module loader. The module loader which attempts to perform redistribution may be in a first idle state. The module loader of the first idle state may fail to perform any operation with respect to a module loader of a second idle state which is a state where a module is loaded into a queue of the module loader, but the loading of the module is not yet executed.

An electronic device according to yet another embodiment of the disclosure may distribute and redistribute a module with regard to the performance (priorities) of module loaders and a current state (an idle state/active state) to perform the loading of a plurality of modules having dependency in parallel without a problem with dependency, thus shortening a loading time and optimizing the performance of module loading by optimally using hardware resources.

Hereinafter, an operation of the electronic device according to an embodiment will be described in detail as an example with reference to FIG. 8.

Figure 8:
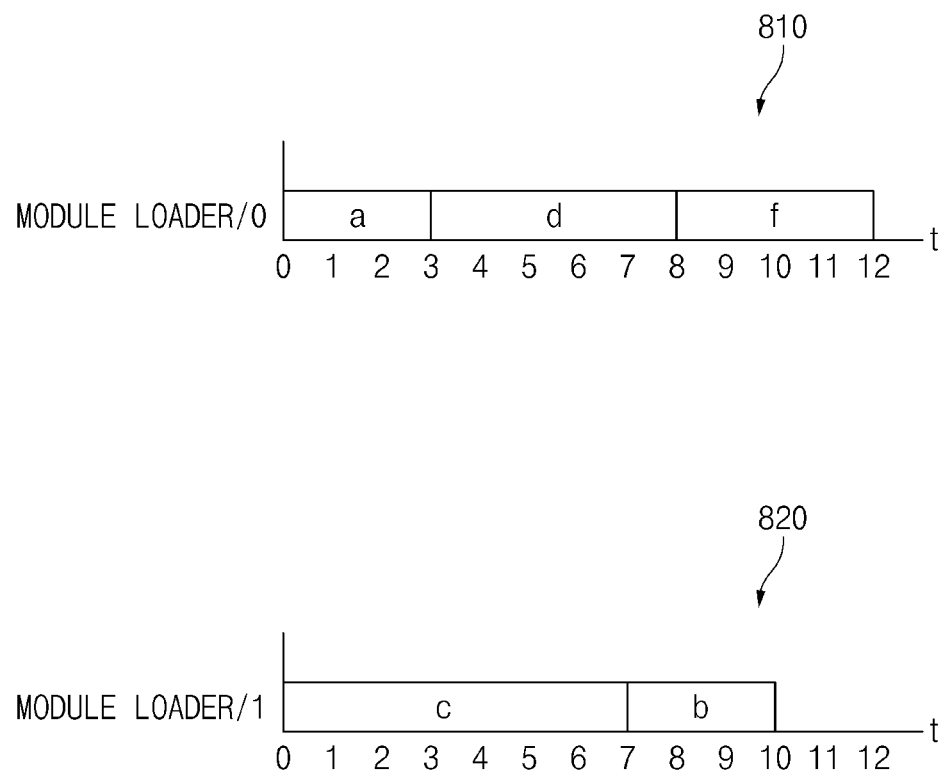
FIG. 8 is a drawing for describing an operation of an electronic device according to an embodiment of the disclosure.

FIG. 8 is a drawing for describing an operation of an electronic device according to an embodiment of the disclosure. FIG. 8 may be a drawing illustrating an operation of a module loader over a timeline in a booting process of an electronic device. Horizontal axes of a first table 810 and a second table 820 of FIG. 8 may refer to time flow.

In an embodiment to be described with reference to FIG. 8, in an electronic device (e.g., an electronic device 101 of FIG. 1) including a processor (e.g., a processor 120 of FIG. 1) having a plurality of two or more cores, a description will be given assuming that a module loader/0 and a module loader/1 are allocated to each of selected two cores.

A memory of the electronic device may store a module information table as shown in Table 8 below. According to embodiments, a workload in Table 8 below may be information which is previously measured and stored by the electronic device and may be information measured and stored by the electronic device while the electronic device performs the loading of a previous module.

TABLE 8

| Module name | State | Workload | Dependency list | |
|---|---|---|---|---|
| a | N | 3 | | |
| b | N | 3 | a | |
| c | N | 7 | | |
| d | N | 5 | a | |
| f | N | 4 | a | c |

Referring to FIG. 8, a dispatcher at a time when t=0 may load module a and module c, in which dependency is cleared, into a queue of the dispatcher. The dispatcher may determine a combination with the smallest imbalance of workloads of the module loaders and may distribute modules loaded into the queue of the dispatcher to the module loaders. According to another embodiment, the dispatcher may determine the imbalance of the workloads based on the priorities when the priorities of the module loaders are different from each other. In a description below, a description will be given assuming that the priorities of the module loaders are the same as each other.

Because all of accumulated workloads of the module loader/0 and the module loader/1 are 0, the dispatcher may distribute module a to the module loader/0 and may distribute module c to the module loader/1 in random order. The accumulated workload of the module loader/0 which receives module a may be 3, and the accumulated workload of the module loader/1 which receives module c may be 7.

The module loader/0 may complete the loading of module a, at a time when t=3, which elapses by the workload of module a. The dispatcher may update a state of module a to T in a module information table and may display that dependency for module a is cleared in a dependency list. Hereinafter, a description of the same configuration as the embodiment described above will be omitted.

The dispatcher may load module b and module d in which all dependency for module a is cleared in a queue of the dispatcher. The workload of module b may be 3, and the workload of module d may be 5.

The dispatcher may determine a combination with the smallest imbalance between the workloads of the module loaders. Because the accumulated workload of the module loader/0 is 3 and the accumulated workload of the module loader/1 is 5, the dispatcher may distribute module b, the workload of which is 3, to the module loader/1 and may distribute module d, the workload of which is 5, to the module loader/0.

The accumulated workload of the module loader/0 which receives module d may be 8, and the accumulated workload of the module loader/1 which receives module b may be 10.

The loading for module c of the module loader/1 may be completed, at a time when t=7, which elapses by the workload of module c from a time when t=0. The dispatcher may update a state of module c to T in the module information table and may display that dependency for module c is cleared in the dependency list.

The dispatcher may load module f, in which all dependency for module c is cleared, into the queue of the dispatcher. The workload of module f may be 4.

The dispatcher may determine a combination with the smallest imbalance between the workloads of the module loaders. Because the accumulated workload of the module loader/0 is 8 and the accumulated workload of the module loader/1 is 10, the dispatcher may distribute module f to the module loader/O, the accumulated workload of which is smaller.

The accumulated workload of the module loader/0 which receives module f may be 12, and the accumulated workload of the module loader/1 may be 10 without change.

The loading of the module b may be ended at a time when t=10, and the loading of module f may be ended at a time when t=12. As identifying that it is in a state where the loading of all the modules is completed, the dispatcher may deliver the loading complete event to all the module loaders and may end the operation of the dispatcher. As the module loader/0 and the module loader/1 also receive the loading complete event, they may end their operations. The booting process may be ended.

The embodiment described above with reference to FIG. 8 has a difference with the embodiment described with reference to FIGS. 3 and 4 in that the dispatcher distributes a module in a combination of minimizing imbalance of accumulated workloads (the sum of workloads) between module loaders with regard to the workload of the module, in distributing the module, in which dependency is cleared, which is loaded into the queue of the dispatcher.

An electronic device according to yet another embodiment of the disclosure may distribute a module in a combination of minimizing imbalance between accumulated workloads of module loaders, thus performing loading of a plurality of modules having dependency in parallel without a problem with dependency to shorten a loading time and optimize the performance of module loading by optimally using hardware resources.

An electronic device according to yet another embodiment disclosed in the disclosure may include a processor including a plurality of cores and a memory electrically connected with the processor and storing instructions. The instructions may include instructions, when executed, causing the processor to control a dispatcher to determine whether loading of a plurality of modules for booting an operating system of the electronic device is completed, identify at least one module, dependency of which is cleared, based on a module information table stored in the memory, as it is determined that there is a module, loading of which is not completed, among the plurality of modules, identify at least one of state information and priority information of a module loader allocated to each of two or more cores among the plurality of cores based on a core information table stored in the memory, as the at least one module is identified, and select at least one of two or more module loaders respectively allocated to the cores and distribute the at least one module, based on the identified information.

According to the disclosure disclosed herein, the memory may store instructions, when executed, causing the processor to control the dispatcher to update the module information table by receiving a loading complete event from the at least one module loader.

According to the disclosure disclosed herein, the memory may store instructions, when executed, causing the processor to control the dispatcher to select at least one module loader which is in an idle state among the module loaders and distribute the at least one module.

According to the disclosure disclosed herein, the memory may store instructions, when executed, causing the processor to control the dispatcher to distribute the at least one module in an order where priorities of a plurality of module loaders which are in the idle state are high, when the plurality of module loaders are identified among the module loaders.

According to the disclosure disclosed herein, the memory may store instructions, when executed, causing the processor to control the dispatcher to first consider whether the module loaders are in an idle state based on the state information and then consider whether a priority is high based on the priority information to distribute the at least one module.

According to the disclosure disclosed herein, the memory may store instructions, when executed, causing the processor to control a first module loader which is in the idle state to identify a second module loader which is in a second active state where there is a module which is loaded into a queue of the second module loader and is waiting for loading and there is a module which is executing loading.

According to the disclosure disclosed herein, the memory may store instructions, when executed, causing the processor to control the first module loader to pull a module loaded into a queue of the second module loader to a queue of the first module loader, as the second module loader is identified.

According to the disclosure disclosed herein, the memory may store instructions, when executed, causing the processor to control the first module loader to identify a third module loader which is in a first active state where there is only a module which is executing loading without a module loaded into the queue of the third module loader, as the second module loader is not identified.

According to the disclosure disclosed herein, the memory may store instructions, when executed, causing the processor to control the first module loader to determine whether the third module loader is lower in priority than the first module loader, as the third module loader is identified, and pull a module which is being loaded by the third module loader to a queue of the first module loader, as it is identified that the third module loader is lower in priority than the first module loader.

According to the disclosure disclosed herein, the memory may store instructions, when executed, causing the processor to control the dispatcher to distribute the at least one module such that a difference between accumulated workloads of the module loaders is minimized, with regard to the accumulated workloads of the module loaders.

An operation method of an electronic device including a processor including a plurality of cores according to yet another embodiment disclosed in the disclosure may include controlling the processor causing a dispatcher to determine whether loading of a plurality of modules for booting an operating system of the electronic device is completed, identify at least one module, dependency of which is cleared, based on a module information table stored in a memory of the electronic device, as it is determined that there is a module, loading of which is not completed, among the plurality of modules, identify at least one of state information and priority information of a module loader allocated to each of two or more cores among the plurality of cores based on a core information table stored in the memory, as at least one module is identified, and select at least one of two or more module loaders respectively allocated to the cores and distribute the at least one module.

According to the disclosure disclosed herein, the operation method may further include controlling the processor causing the dispatcher to update the module information table by receiving a loading complete event from the at least one module loader.

According to the disclosure disclosed herein, the operation method may further include controlling the processor causing the dispatcher to select at least one module loader which is in an idle state among the module loaders and distribute the at least one module.

According to the disclosure disclosed herein, the operation method may further include controlling the processor causing the dispatcher to distribute the at least one module in an order where priorities of a plurality of module loaders which are in the idle state are high, when the plurality of module loaders are identified among the module loaders.

According to the disclosure disclosed herein, the operation method may further include controlling the processor causing the dispatcher to first consider whether the module loaders are in an idle state based on the state information and then consider whether a priority is high based on the priority information to distribute the at least one module.

According to the disclosure disclosed herein, the operation method may further include controlling the processor causing a first module loader which is in the idle state to identify a second module loader which is in a second active state where there is a module which is loaded into a queue of the second module loader and is waiting for loading and there is a module which is executing loading.

According to the disclosure disclosed herein, the operation method may further include controlling the processor causing the first module loader to pull a module loaded into a queue of the second module loader to a queue of the first module loader, as the second module loader is identified.

According to the disclosure disclosed herein, the operation method may further include controlling the processor causing the first module loader to identify a third module loader which is in a first active state where there is only a module which is executing loading without a module loaded into the queue of the third module loader, as the second module loader is not identified.

According to the disclosure disclosed herein, the operation method may further include controlling the processor causing the first module loader to determine whether the third module loader is lower in priority than the first module loader, as the third module loader is identified, and pull a module which is being loaded by the third module loader to a queue of the first module loader, as it is identified that the third module loader is lower in priority than the first module loader.

According to the disclosure disclosed herein, the operation method may further include controlling the processor causing the dispatcher to distribute the at least one module such that a difference between accumulated workloads of the module loaders is minimized, with regard to the accumulated workloads of the module loaders.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a processor including a plurality of cores; and
memory electrically connected with the processor and storing instructions,
wherein the instructions, when executed, cause the processor to control a dispatcher to:
determine whether loading of a plurality of modules for booting an operating system of the electronic device is completed,
identify at least one module among the plurality of modules for which loading is not completed and for which a dependency is cleared, based on a module information table stored in the memory,
identify at least one of state information and priority information of two or more module loaders allocated to two or more cores among the plurality of cores, respectively, based on a core information table stored in the memory, as the at least one module is identified, and
select at least one module loader of the two or more module loaders and distribute the at least one module to the at least one module loader, based on the identified at least one of state information and priority information.

2. The electronic device of claim 1, wherein the instructions, when executed, further cause the processor to control the dispatcher to:
update the module information table by receiving a loading complete event from the at least one module loaders.

3. The electronic device of claim 1, wherein the instructions, when executed, further cause the processor to control the dispatcher to:
select the at least one module loader based on whether the at least one module loader is in an idle state.

4. The electronic device of claim 3, wherein the instructions, when executed, further cause the processor to control the dispatcher to:
distribute the at least one module in an order where priorities of a plurality of module loaders which are in the idle state are high, when the plurality of module loaders are identified among the two or more module loaders.

5. The electronic device of claim 1, wherein the instructions, when executed, further cause the processor to control the dispatcher to:
first consider whether the at least one module loader of the two or more module loaders are in an idle state based on the state information and then consider whether a priority is high based on the priority information to distribute the at least one module.

6. The electronic device of claim 5, wherein the instructions, when executed, further cause the processor to control a first module loader which is in the idle state to:
identify a second module loader which is in a second active state where there is a module which is loaded into a queue of the second module loader and is waiting for loading and there is a module which is executing loading.

7. The electronic device of claim 6, wherein the instructions, when executed, further cause the processor to control the first module loader to:
pull a module loaded into a queue of the second module loader to a queue of the first module loader, as the second module loader is identified.

8. The electronic device of claim 6, wherein the instructions, when executed, further cause the processor to control the first module loader to:
identify a third module loader which is in a first active state where there is only a module which is executing loading without a module loaded into the queue of the third module loader, as the second module loader is not identified.

9. The electronic device of claim 8, wherein the memory stores instructions, when executed, further causing the processor to control the first module loader to:
determine whether the third module loader is lower in priority than the first module loader, as the third module loader is identified, and
pull a module which is being loaded by the third module loader to a queue of the first module loader, as it is identified that the third module loader is lower in priority than the first module loader.

10. The electronic device of claim 1, wherein the memory stores instructions, when executed, further causing the processor to control the dispatcher to:
distribute the at least one module such that a difference between accumulated workloads of the at least one of two or more module loaders is minimized, with regard to the accumulated workloads of the at least one of two or more module loaders.

11. An operation method of an electronic device including a processor including a plurality of cores, the operating method comprising:
controlling the processor causing a dispatcher to:
determine whether loading of a plurality of modules for booting an operating system of the electronic device is completed,
identify at least one module among the plurality of modules for which loading is not completed and for which a dependency is cleared, based on a module information table stored in memory of the electronic device,
identify at least one of state information and priority information of two or more module loaders allocated to two or more cores among the plurality of cores, respectively, based on a core information table stored in the memory, as at least one module is identified, and
select at least one module loader of the two or more module loaders and distribute the at least one module to the at least one module loader.

12. The operation method of claim 11, further comprising:
controlling the processor causing the dispatcher to update the module information table by receiving a loading complete event from the at least one module loaders.

13. The method of claim 11, further comprising:
controlling the processor causing the dispatcher to select the at least one module loader based on whether the at least one module loader is in an idle state.

14. The operation method of claim 13, further comprising:
controlling the processor causing the dispatcher to distribute the at least one module in an order where priorities of a plurality of module loaders which are in the idle state are high, when the plurality of module loaders are identified among the two or more module loaders.

15. The operation method of claim 11, further comprising:

controlling the processor causing the dispatcher to first consider whether the at least one of two or more module loaders is in an idle state based on the state information and then consider whether a priority is high based on the priority information to distribute the at least one module.

16. The operation method of claim 15, further comprising:

controlling the processor causing a first module loader which is in the idle state to identify a second module loader which is in a second active state where there is a module which is loaded into a queue of the second module loader and is waiting for loading and there is a module which is executing loading.

17. The operation method of claim 16, further comprising:

controlling the processor causing the first module loader to pull a module loaded into a queue of the second module loader to a queue of the first module loader, as the second module loader is identified.

18. The operation method of claim 16, further comprising:

controlling the processor causing the first module loader to identify a third module loader which is in a first active state where there is only a module which is executing loading without a module loaded into the queue of the third module loader, as the second module loader is not identified.

19. The operation method of claim 18, further comprising:

controlling the processor causing the first module loader to:
  determine whether the third module loader is lower in priority than the first module loader, as the third module loader is identified, and
  pull a module which is being loaded by the third module loader to a queue of the first module loader, as it is identified that the third module loader is lower in priority than the first module loader.

20. The operation method of claim 19, wherein, when a priority of the third module loader is greater than or equal to a priority of a module loader in a first active state, the first module loader waits until the module is delivered from the dispatcher and is enqueued into the queue, wherein, when the priority of the third module loader is less than the priority of the module loader in the first active state, the first module loader pulls the module which is being loaded by the third module loader and performs the loading of the module, and wherein, when there is no module loader which is in the first active state, the first module loader waits until the module is delivered from the dispatcher and is enqueued into the queue.

* * * * *